(12) United States Patent
Yoshihashi

(10) Patent No.: US 11,269,506 B2
(45) Date of Patent: Mar. 8, 2022

(54) INFORMATION PROCESSING SYSTEM, SERVER APPARATUS, AND INFORMATION PROCESSING METHOD

(71) Applicant: Ryohsuke Yoshihashi, Kanagawa (JP)

(72) Inventor: Ryohsuke Yoshihashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 69 days.

(21) Appl. No.: 16/727,197

(22) Filed: Dec. 26, 2019

(65) Prior Publication Data
US 2020/0210057 A1    Jul. 2, 2020

(30) Foreign Application Priority Data

Dec. 27, 2018   (JP) .............................. JP2018-245975

(51) Int. Cl.
   *G06F 3/048*      (2013.01)
   *G06F 3/04847*    (2022.01)
   *G06F 3/0482*     (2013.01)
   *H04L 67/02*      (2022.01)

(52) U.S. Cl.
   CPC ........ *G06F 3/04847* (2013.01); *G06F 3/0482* (2013.01); *H04L 67/02* (2013.01)

(58) Field of Classification Search
   CPC .......................... G06F 3/0482; G06F 3/04847
   See application file for complete search history.

(56) References Cited

U.S. PATENT DOCUMENTS

| | | | | |
|---|---|---|---|---|
| 5,864,871 A | * | 1/1999 | Kitain | ................... G06F 16/10 |
| 7,769,780 B2 | | 8/2010 | Kashiwagi et al. | |
| 2004/0261010 A1 | | 12/2004 | Matsuishi | |
| 2009/0204919 A1 | | 8/2009 | Dan | |
| 2011/0214077 A1 | * | 9/2011 | Singh | ................... G06F 9/451 715/762 |
| 2014/0136935 A1 | * | 5/2014 | Santillie | ........... H04N 21/41415 715/204 |
| 2016/0072972 A1 | * | 3/2016 | Akuzawa | ........... H04N 1/00506 358/1.13 |
| 2019/0289157 A1 | | 9/2019 | Zhang et al. | |

FOREIGN PATENT DOCUMENTS

| | | |
|---|---|---|
| JP | 2004-318842 | 11/2004 |
| JP | 2009-187389 | 8/2009 |
| JP | 4893108 | 3/2012 |

* cited by examiner

*Primary Examiner* — Claudia Dragoescu
(74) *Attorney, Agent, or Firm* — IPUSA, PLLC

(57) ABSTRACT

An information processing system includes a server apparatus that provides a plurality of applications; and a terminal device coupled to the server apparatus via a network, and sets a plurality of pieces of custom information for customizing display screens of the applications. The server apparatus includes a memory and a processor coupled to the memory and configured to manage application information that includes the plurality of pieces of custom information and reference information, cause the terminal device to display a setting screen on which a given piece of custom information is to be set, in response to a request from the terminal device, display a list of the plurality of pieces of custom information, included in the application information, enabled for selection on the setting screen, and determine an order of displaying the list of the plurality of pieces of custom information based on the reference information.

11 Claims, 19 Drawing Sheets

FIG.5A

```
                                        451
[
  {
"id": "112233",
     "name":"pink",
     "header":{
        "background color":"pink",
        "color":"black"
     },
     "body":{
            ....
     }
  ....
  },
  {
    "name":"green"
  ....
  },
  {
    "name":"blue"
  ....
  }
]
```

FIG.5B

```
                                    ⌒452
{
   "header":[
      "fontsize",
      "color",
      "background color"
   ],
   "body":[
            ...
   ],
   "button":[
            ...
   ],
   ...
}
```

FIG.6

```
                                            453
[
  {
    "type":"scan",
    "name":"application1",
    ...
    "css":{
              "id": "123344",        ⎫
              "theme": "pink"        ⎬ 601
    }                                ⎭

"Usage": {                       ⎫
      "region":"us",                 ⎬ 602
      "industry":"fashion"           ⎭
    }
  },
  {
    "type":"print",
    "name":"application2",
    ...
    "css":{
              "id": "234433",
              "theme": "blue"
    }
    "Usage" : {
      "region":"eu",
      "industry":"education"
    }
  },
  ...
]
```

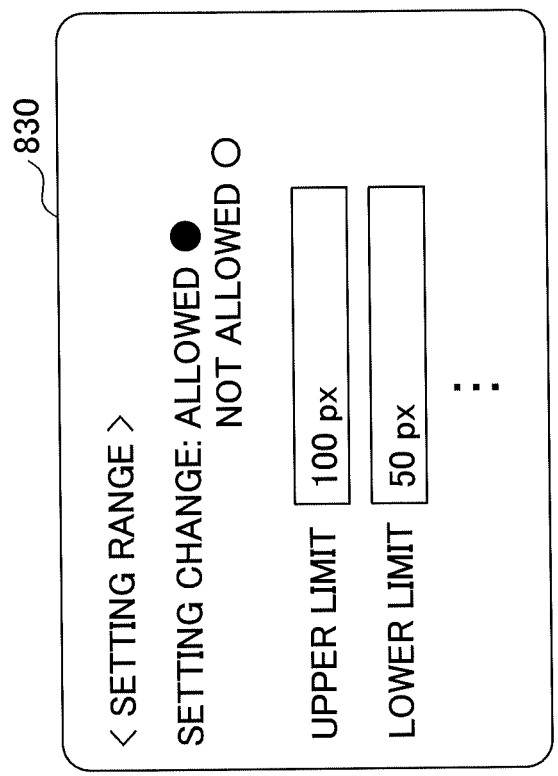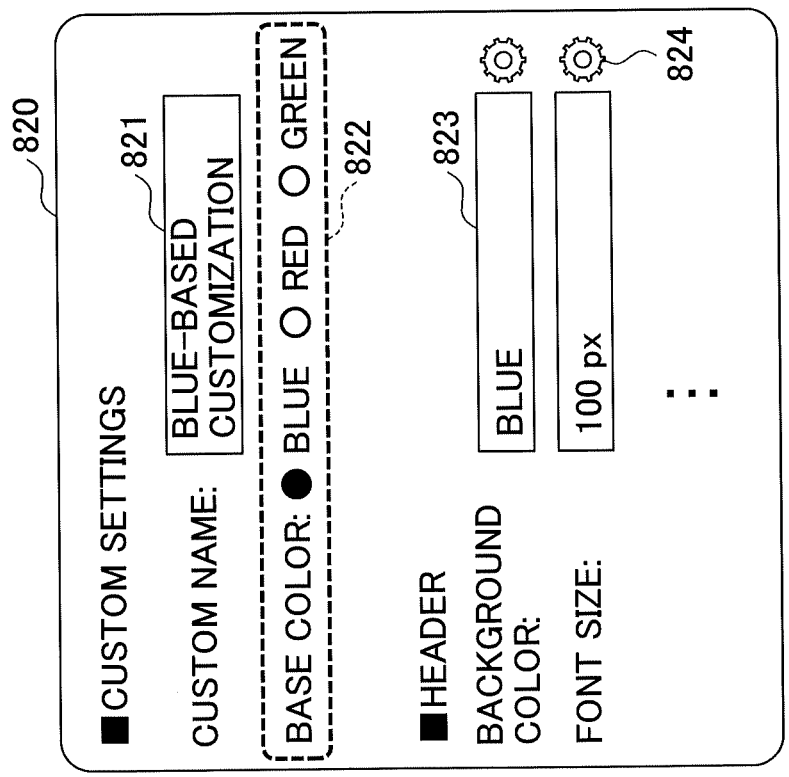

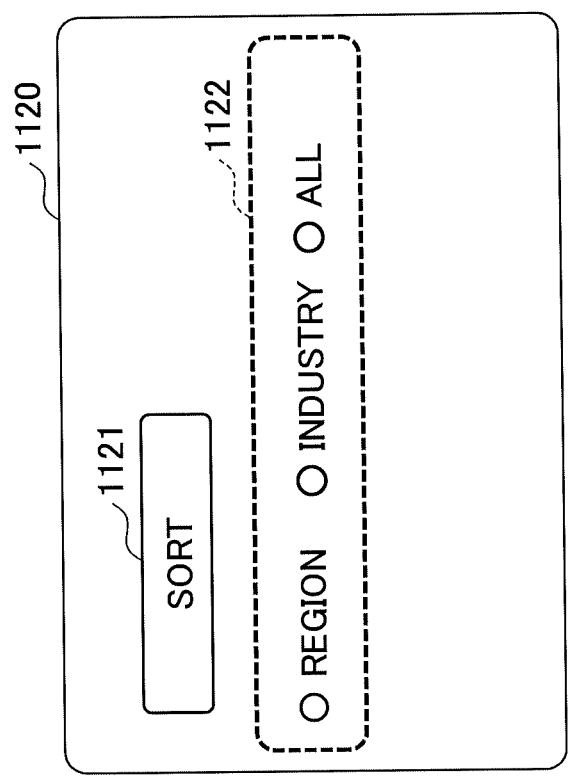

INFORMATION PROCESSING SYSTEM, SERVER APPARATUS, AND INFORMATION PROCESSING METHOD

CROSS-REFERENCE TO RELATED APPLICATIONS

This application is based on and claims priority to Japanese Patent Application No. 2018-245975, filed on Dec. 27, 2018, the entire contents of which are incorporated herein by reference.

BACKGROUND OF THE INVENTION

1. Field of the Invention

The disclosures herein relate to an information processing system, a server apparatus, and an information processing method.

2. Description of the Related Art

A method for displaying a user interface (UI) of a web page is customized for each user, and the UI is displayed by the customized method.

For example, there is known a web page creation apparatus that stores operation item display information indicating whether each operation item needs to be displayed on a per-user basis, and creates a web page including operation items that need to be displayed, based on the operation item display information (see Patent Document 1, for example).

There is a need to customize a display screen on a per-application basis in an information processing system that provides a plurality of applications via a service providing server.

However, in the conventional technology as described in Patent Document 1, custom information of an application cannot be created by utilizing custom information of another already-registered application, thus making customization of a display screen difficult.

RELATED-ART DOCUMENTS

Patent Documents

Patent Document 1: Japanese Unexamined Patent Application Publication No. 2004-318842

SUMMARY OF THE INVENTION

According to an embodiment of the present invention, an information processing system includes a server apparatus configured to provide a plurality of applications; and a terminal device coupled to the server apparatus via a network, and configured to set a plurality of pieces of custom information for customizing display screens of the plurality of applications. The terminal device includes a first memory and a first processor coupled to the first memory and configured to display a setting screen, and receive an operation performed on the setting screen. The server apparatus includes a second memory and a second processor coupled to the second memory and configured to manage application information that includes the plurality of pieces of custom information and reference information, cause the terminal device to display the setting screen on which a given piece of custom information is to be set, in response to a request from the terminal device, display a list of the plurality of pieces of custom information, included in the application information, enabled for selection on the setting screen, and determine an order of displaying the list of the plurality of pieces of custom information based on the reference information.

BRIEF DESCRIPTION OF THE DRAWINGS

Other objects and further features of the present invention will be apparent from the following detailed description when read in conjunction with the accompanying drawings, in which:

FIG. 5A and FIG. 5B are diagrams (1) illustrating examples of application information managed by an application management unit according to an embodiment;

FIG. 6 is a diagram (2) illustrating an example of the application information managed by the application management unit according to an embodiment;

FIG. 8A through FIG. 8C are diagrams illustrating examples of display screens;

FIG. 11A and FIG. 11B are diagrams (1) illustrating examples of display screens according to the first embodiment;

DESCRIPTION OF THE EMBODIMENTS

According to an embodiment of the present invention, custom information of a target application is created by utilizing custom information of a plurality of pre-registered applications.

In the following, embodiments of the present invention will be described with reference to the accompanying drawings.

<System Configuration>

Figure 1:
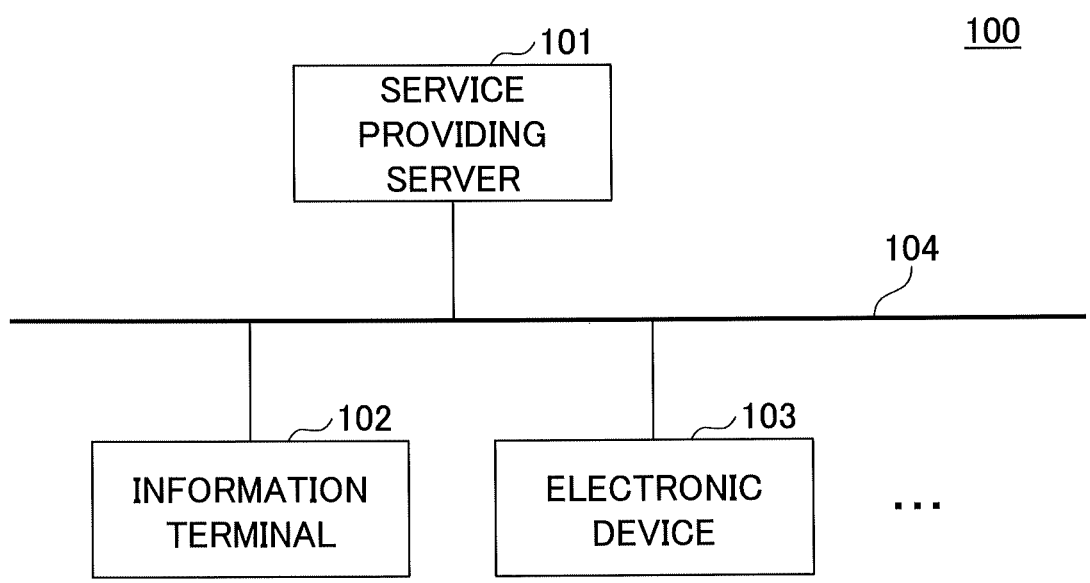
FIG. 1 is a diagram illustrating an example of a system configuration of an information processing system according to an embodiment.

FIG. 1 is a diagram illustrating an example of a system configuration of an information processing system according to an embodiment. An information processing system 100 includes a service providing server 101, an information terminal 102, and at least one electronic device 103, which are communicatively coupled to each other via a network 104 such as the Internet or a local area network (LAN).

The service providing server (server apparatus) 101 is a system that includes one or more information processing apparatuses each having a computer configuration. For example, the service providing server 101 provides an application (web application), executing a workflow (procedure) in which multiple processes are defined, to the electronic device 103 coupled to the service providing server 101 via the network 104.

As used herein the "workflow" means information that defines a series of processes in which multiple components are combined. The multiple components execute predetermined processes, such as an input process, a conversion process, and an output process, for target electronic data such as image data. The components are programs that execute the processes included in the workflow, and may also be referred to as plug-ins.

The application that executes the workflow is an example of an application provided by the service providing server 101. The application provided by the service providing server 101 may execute any process other than the workflow.

The information terminal (terminal device) 102 is an information processing apparatus such as a personal computer (PC), a notebook PC, a smartphone, or a tablet terminal. An application developer (or a user) accesses a web page provided by the service providing server 101 through a web browser of the information terminal 102 to configure application settings or workflow settings. The information terminal 102 is an example of a terminal device that sets custom information for customizing a display screen of an application.

The electronic device 103 includes a web browser, and accesses a web page provided by the service providing server 101 to use an application. The following description will be given on the assumption that the electronic device 103 is an image forming apparatus such as a multifunction peripheral (MFP) in which a scan function, a copy function, a printer function, a facsimile function, and any other function are included in a single housing.

However, the electronic device 103 is not limited to the image forming apparatus, and may be any device including a web browser and capable of accessing a web page provided by the service providing server 101. For example, the electronic device 103 may be an output apparatus such as a projector (PJ), an interactive whiteboard (IWB: a whiteboard having an electronic blackboard function capable of interactive communication), digital signage, or a head-up display (HUD). Further, the electronic device 103 may be equipment such as an industrial machine, an imaging apparatus, a sound collector, medical equipment, a network home appliance, or a vehicle (a connected car). Further, the electronic device 103 may be a general-purpose information processing apparatus such as a notebook PC, a mobile phone, a smartphone, a tablet terminal, a game console, a personal digital assistant (PDA), a digital camera, a wearable PC, or a desktop PC.

The above-described system configuration of the information processing system 100 is merely an example. For example, the developer may use the web browser of the electronic device 103 to configure application settings. Further, the user may use the web browser of the information terminal 102 to execute an application provided by the service providing server 101. Further, functions of the service providing server 101 may be separately included in a plurality of server apparatuses. For example, a server apparatus that manages applications may differ from a server apparatus that executes workflows.

<Hardware Configurations>

Next, hardware configurations of the apparatuses included in the information processing system 100 will be described.

(Hardware Configuration of Service Providing Server and Information Terminal)

Figure 2:
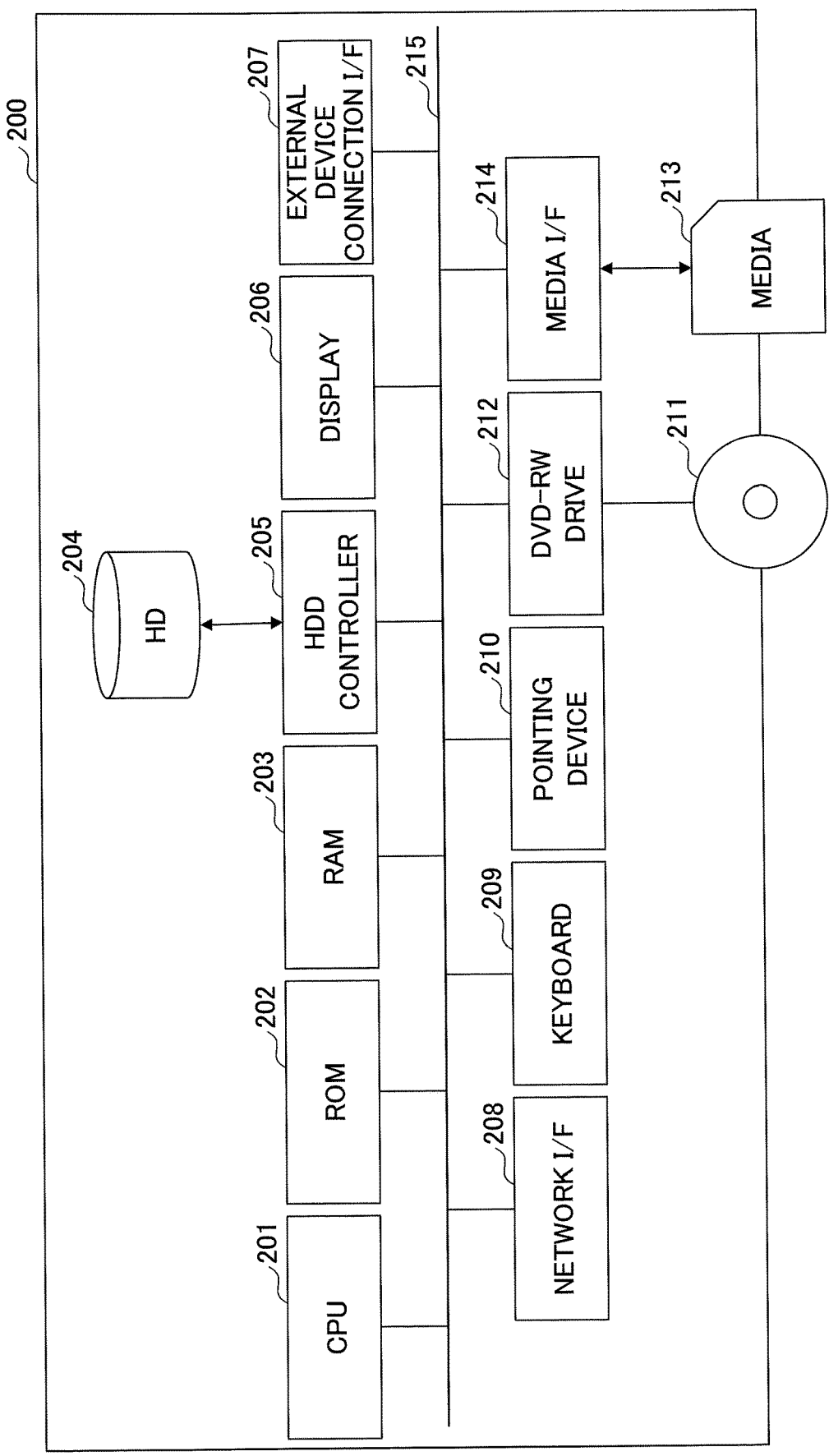
FIG. 2 is a diagram illustrating an example of a hardware configuration of a computer according to an embodiment.

FIG. 2 is a diagram illustrating an example of a hardware configuration of a computer according to an embodiment. For example, the service providing server 101 may include the hardware configuration of a computer 200 as illustrated in FIG. 2. Alternatively, the service providing server 101 may be implemented by a plurality of computers 200 each having the hardware configuration as illustrated in FIG. 2. The information terminal 102 may include the hardware configuration of the computer 200 as illustrated in FIG. 2.

As illustrated in FIG. 2, the computer 200 includes a central processing unit (CPU) 201, a read-only memory (ROM) 202, a random-access memory (RAM) 203, a hard disk (HD) 204, a hard disk drive (HDD) controller 205, a display 206, an external device connection interface (I/F) 207, a network I/F 208, a keyboard 209, a pointing device 210, a digital versatile disc rewritable (DVD-RW) drive 212, a media I/F 214, and a bus line 215.

The CPU 201 controls the entire operation of the computer 200. The ROM 202 stores programs used to start the CPU 201 such as an initial program loader (IPL). The RAM 203 is used as a work area for the CPU 201. The HD 204 stores various types of data such as programs. The HDD controller 205 controls the reading/writing of various types of data from/to the HD 204, as controlled by the CPU 201.

The display 206 displays various types of information such as a cursor, menus, windows, characters, and images. The external device connection I/F 207 is an interface for connecting various types of external devices. Examples of the external devices include a universal serial bus (USB) memory and a printer. The network I/F 208 is an interface for data communication via the network 104.

The keyboard 209 is a type of an input device having a plurality of keys for inputting characters, numbers, and various types of instructions. The pointing device 210 is a type of an input device that selects or executes various types of instructions, selects an object to be processed, and moves the cursor. The DVD-RW drive 212 controls the reading/writing of various types of data from/to a DVD-RW 211. The DVD-RW 211 is as an example of a removable recording medium. Note that the DVD-RW 211 is not limited to the DVD-RW, and may be a DVD-R. The media I/F 214 controls the reading/writing (storage) of data from/to (into) a media 213 such as a flash memory. The bus line 215 includes an address bus, a data bus, and various types of control signals for electrically connecting the above-described elements.

(Hardware Configuration of Electronic Device)

Figure 3:
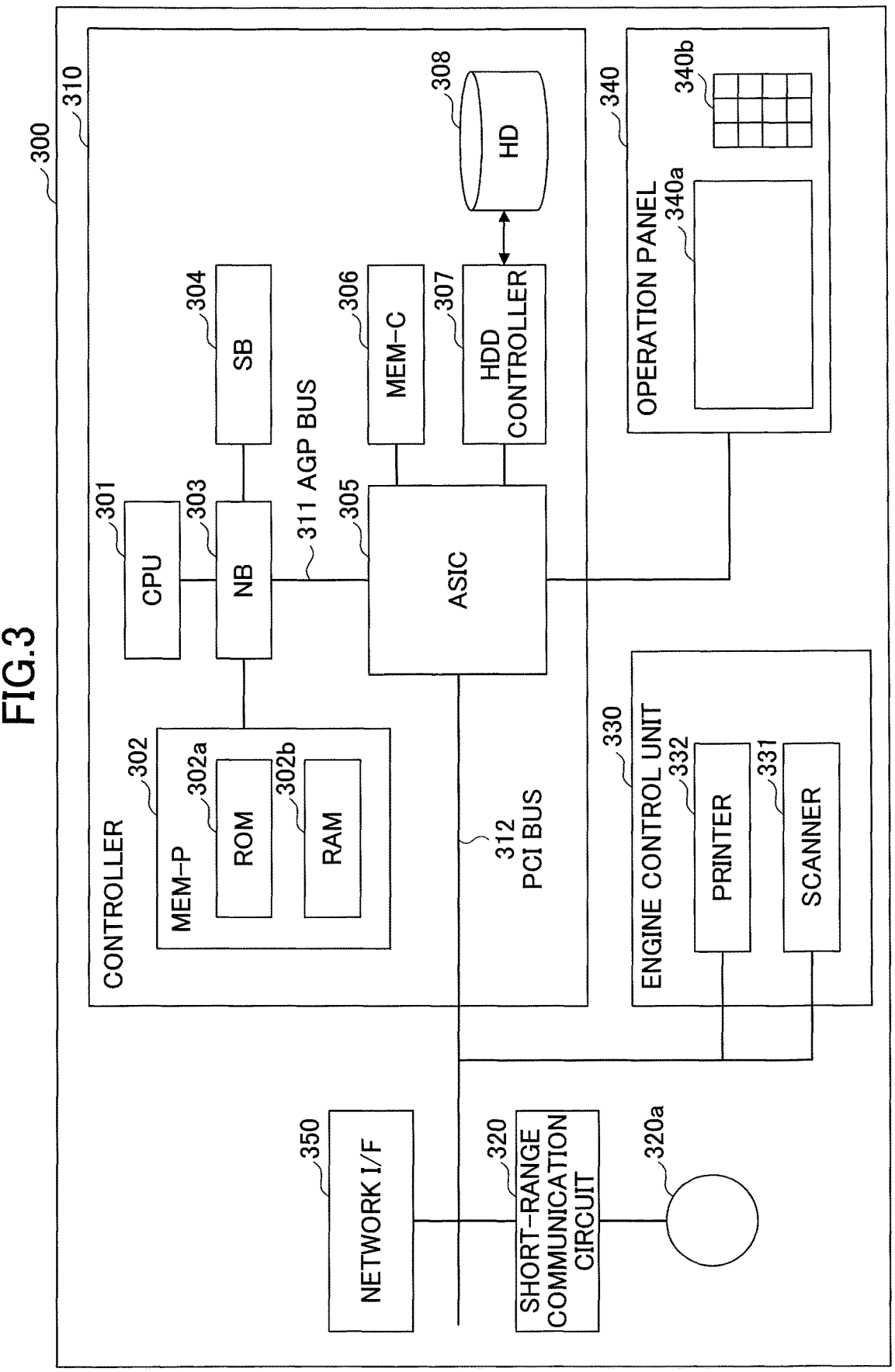
FIG. 3 is a diagram illustrating an example of a hardware configuration of an image forming apparatus according to an embodiment.

FIG. 3 is a diagram illustrating an example of a hardware configuration of an image forming apparatus according to an embodiment. As an example of a hardware configuration of the electronic device 103, a hardware configuration of an image forming apparatus 300 will be described below.

As illustrated in FIG. 3, the image forming apparatus 300 includes a controller 310, a short-range communication circuit 320, an engine control unit 330, an operation panel 340, and a network I/F 350.

The controller 310 includes a CPU 301, which is the main part of the computer, a system memory (MEM-P) 302, a northbridge (NB) 303, a southbridge (SB) 304, an application-specific integrated circuit (ASIC) 305, a local memory (MEM-C) 306, which is a storage unit, a HDD controller 307, and a HD 308, which is a storage unit. The NB 303 and the ASIC 305 are connected via an accelerated graphics port (AGP) bus 311.

The CPU 301 is a control unit that performs overall control of the image forming apparatus 300. The NB 303 is a bridge that connects the CPU 301 to the MEM-P 302, the SB 304, and the AGP bus 311, and includes a memory controller that controls reading/writing from/to the MEM-P 302, a peripheral component interconnect (PCI) master, and an AGP target.

The MEM-P 302 includes a ROM 302a and a RAM 302b. The ROM 302a is a memory that stores programs and data for implementing functions of the controller 310. The RAM 302b is a memory used for deployment of programs and data, and for image rendering performed by a printer. A program stored in the RAM 302b may be recorded and provided in a computer-readable recording medium such as a CD-ROM, a CD-R or a DVD in an installable format or an executable format file.

The SB 304 is a bridge that connects the NB 303 to PCI devices and peripheral devices. The ASIC 305 is an integrated circuit (IC) for use in image processing and having hardware elements for image processing. The ASIC 305 is connected to the AGP bus 311, a PCI bus 312, the HDD controller 307, and the MEM-C 306. The ASIC 305 includes a PCI target and an AGP master, an arbiter (ARB) that forms the core of the ASIC 305, a memory controller that controls the MEM-C 306, a direct memory access controller that rotates image data using hardware logic, and a PCI unit that transfers data between a scanner 331 and a printer 332 via the PCI bus 312. Note that a USB interface and an Institute of Electrical and Electronics Engineers (IEEE) 1394 interface may be connected to the ASIC 305.

The MEM-C 306 is a local memory used as a copy image buffer and a code buffer. The HD 308 is storage that stores image data, font data used at the time of printing, and forms. The HDD controller 307 controls the reading/writing of data from/to the HD 308, as controlled by the CPU 301. The AGP BUS 311 is a bus interface for a graphics accelerator card introduced to accelerate graphics processes. The AGP BUS 311 directly accesses the MEM-P 302 with a high throughput, thereby accelerating processes related to the graphics accelerator card.

The short-range communication circuit 320 includes one or more short-range wireless communication units 320a, for example. Examples of the short-range wireless communication units 320a include wireless circuits, antennas, and control circuits that perform communication in accordance with short-range wireless communication standards, such as near-field communication (NFC) and Bluetooth (registered trademark).

The engine control unit 330 includes a scanner 331 and a printer 332. The scanner 331 is a reading device that reads a document. The printer 332 is a printing device that prints print data on a printing medium. The scanner 331 or the printer 332 includes an image processing section such as error diffusion or gamma correction.

The operation panel 340 includes a panel display 340a such as a touch panel, and also includes operation buttons 340b. The panel display 340a displays current setting values and a selection screen, and receives an input from an operator. The operation buttons 340b include a numeric keypad that receives setting values related to image forming conditions such as density setting conditions, and also includes a start key that receives an instruction to start copying. The controller 310 performs overall control of the image forming apparatus 300, and controls image rendering, communication, and inputs from the operation panel 340.

In addition, the image forming apparatus 300 may use an application switching key of the operation panel 340 to switch between a document box function, the copy function, the printer function, and the facsimile function. When the document box function is selected, a document box mode is set, when the copy function is selected, a copy mode is set, when the printer function is selected, a printer mode is set, and when the facsimile function is selected, a facsimile mode is set.

The network I/F 350 is an interface for data communication via the network 104. The short-range communication circuit 320 and the network I/F 350 are electrically coupled to the ASIC 305 via the PCI bus 312.

<Functional Configurations>

Figure 4:
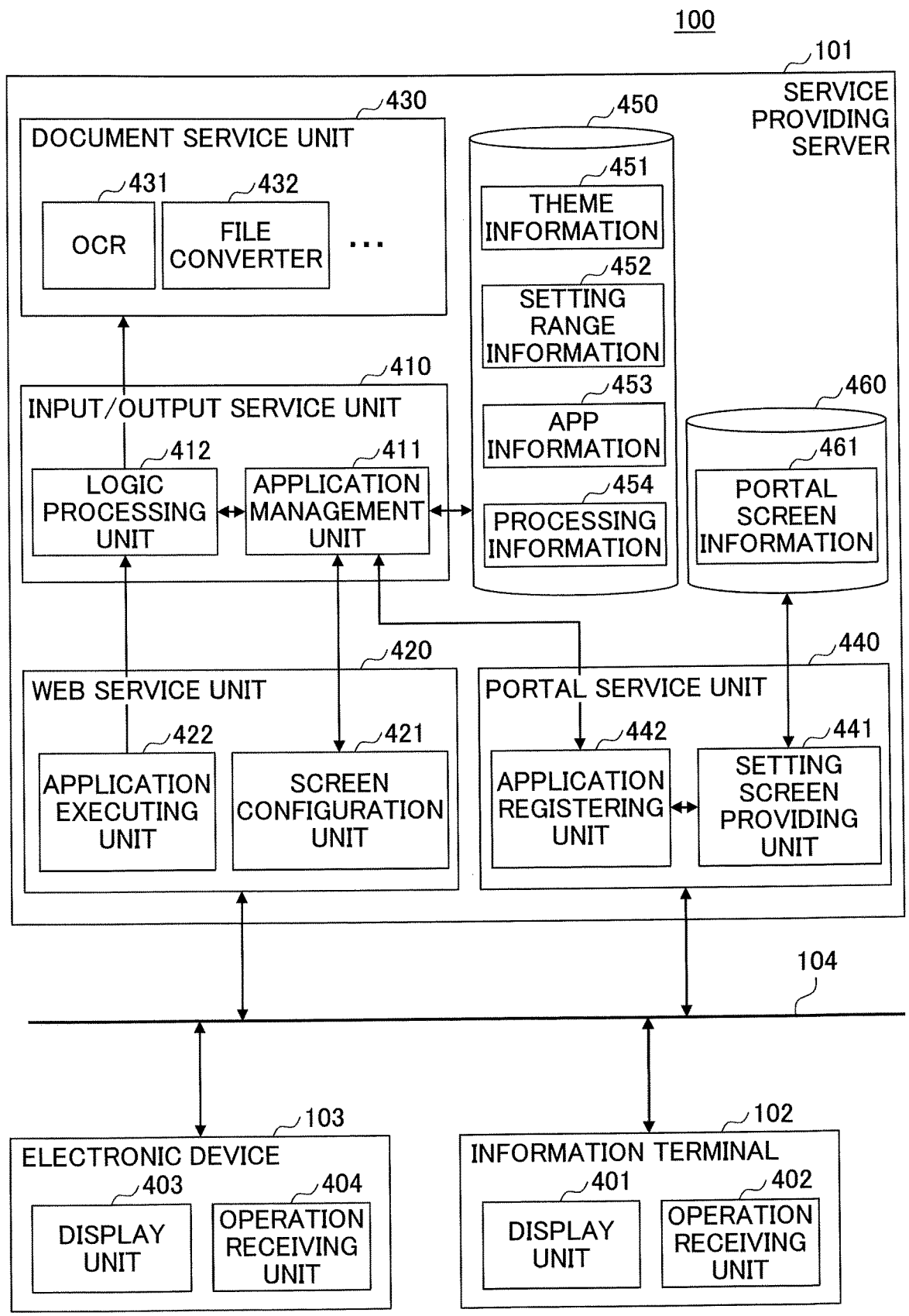
FIG. 4 is a diagram illustrating an example of a functional configuration of the information processing system according to an embodiment.

Next, a functional configuration of the information processing system 100 will be described. FIG. 4 is a diagram illustrating an example of a functional configuration of the information processing system according to an embodiment.

(Functional Configuration of Service Providing Server)

The service providing server 101 implements an input/output service unit 410, a web service unit 420, a document service unit 430, and a portal service unit 440 by causing the CPU 201 of FIG. 2 or the plurality of computers 200 to execute one or more programs. Note that at least some of the above-described functional units may be implemented by hardware.

Further, the service providing server 101 includes storage units such as an application information storage unit 450 and a portal screen information storage unit 460. The application information storage unit 450 and the portal screen information storage unit 460 may be implemented by a HDD. Further, one or both of the application information storage unit 450 and the portal screen information storage unit 460 may be implemented by an external device such as a storage server.

The input/output service unit 410 performs processes related to management and execution of applications (web applications) provided by the service providing server 101. As illustrated in FIG. 4, the input/output service unit 410 includes an application managing unit 411 and a logic processing unit 412.

The application management unit 411 manages a plurality of applications provided by the service providing server 101. For example, the application management unit 411 stores, in the application information storage unit 450, application information such as theme information 451, setting range information 452, application (app) information 453, and processing information 454, and manages the application information.

Further, in response to a request from the logic processing unit 412, the web service unit 420, or the portal service unit 440, the application management unit 411 provides some or all of the application information stored in the application information storage unit 450.

Further, in response to a request from the portal service unit 440, the application management unit 411 registers application information in the application information storage unit 450. Accordingly, information on the plurality of pieces of applications is registered in the service providing server 101.

FIG. 5A through FIG. 6 are diagrams illustrating an example of the application information managed by the application management unit according to an embodiment. FIG. 5A illustrates an example of the theme information 451 included in the application information. The theme information 451 stores a plurality of themes that can be set on the display screen of each application.

As used herein, the term "theme" refers to setting information that combines multiple settings such as background, fonts, text colors, and icons displayed on a display screen of an application. The user can set multiple settings at once by selecting a theme.

In the theme information 451 illustrated in FIG. 5A, "id" indicates identification information for identifying a theme. In addition, "name" indicates the name of the theme. Further, "header" and subsequent items indicate respective setting values.

FIG. 5B indicates an example of the setting range information 452 included in the application information. Among setting items displayed on the display screen of each application, customizable items are defined in the setting range information 452.

In the setting range information 452 illustrated in FIG. 5B, "header" defines "font size", "color", and "background color". This means that the font size, the text color, and the background color of the header are customizable. Further, the setting range information 452 may include various types of information, such as a range of font sizes that can be set and a range of colors that can be selected as the text color.

FIG. 6 illustrates an example of app information 453 included in the application information. The app information 453 stores information of a plurality of applications (web applications) provided by the service providing server 101.

For example, in the app information 453 illustrated in FIG. 6, "type" indicates the type of an application (such as "scan" and "print"), and "name" indicates the name of the application. Further, the app information 453 includes information such as "css" information 601 and "usage" information 602.

In the "css" information 601, "id" indicates identification information for identifying a theme of the application. Further, "theme" indicates the name of the theme of the application.

Further, for example, when an application screen is customized by the developer, a custom name (an example of information for identifying custom information), a base color, and values for custom settings (custom information) are registered in the "css" information 601.

Further, in the "usage" information 602, "region" indicates a region where the application is used, for example. Further, "industry" indicates an industry in which the application is used, for example.

The "id", the "theme", the "region", the "industry", and information indicating a base color included in the app information 453 are examples of reference information included in the application information. The app information 453 may include various types of reference information other than the above-described information.

Further, the application information storage unit 450 stores the processing information 454 that defines a flow of a process (such as a workflow) performed by each application. In the present embodiment, the processing information 454 may have any configuration, and thus a detailed description thereof will be omitted.

Note that the configurations of the application information illustrated in FIGS. 5A through FIG. 6 are merely examples. For example, the setting range information 452 and the processing information 454 may be included in the app information 453.

Referring back to FIG. 4, the functional configuration of the service providing server 101 will continue to be described.

The logic processing unit 412 acquires application information (such as the app information 453 and the processing information 454) managed by the application management unit 411, in response to a request from the web service unit 420. Further, the logic processing unit 412 executes an application based on the application information acquired from the application management unit 411. For example, the logic processing unit 412 causes the document service unit 430 to sequentially execute a series of processes defined in a workflow, based on the processing information 454.

The web service section 420 performs a process for using an application provided by the service providing server 101 through the web browser of the electronic device 103 (or the web browser of the information terminal 102). For example, the web service unit 420 functions as an application server that provides a web application to the web browser. The web service unit 420 includes a screen configuration unit 421 and an application executing unit 422 as illustrated in FIG. 4.

In response to a request from the web browser, the screen configuration unit 421 causes the web browser to display a display screen on which to use an application provided by the service providing server 101 (hereinafter referred to as an "application screen").

For example, the screen configuration unit 421 acquires application information from the application management unit 411, and utilizes the acquired application information to generate an application screen. In addition, the screen configuration unit 421 causes the web browser of the electronic device 103 to display the generated application screen, for example.

The application executing unit 422 requests the input/output service unit 410 to execute an application in accordance with the user's operation performed on the application screen.

The document service unit 430 uses components such as an optical character recognition/reader (OCR) 431 and a file converter 432 to perform a series of processes defined in a workflow, as controlled by the logic processing unit 412.

The OCR 431 is, for example, a component that performs an OCR process for converting characters, read by a scanner from an image, into text data. The file converter 432 is a component that performs a file conversion process for converting an electronic data format. Note that the OCR 431 and the file converter 432 are examples of components included in the document service unit 430. The document service unit 430 may include various components other than the above-described components.

The portal service unit 440 performs processes that allow the application developer (or the user) to use the web browser of the information terminal 102 to register an application and configure application settings. The portal service unit 440 includes a setting screen providing unit 441 and an application registering unit 442 as illustrated in FIG. 4.

The setting screen providing unit 441 creates an application setting screen by using application information managed by the application management unit 411 and also portal screen information 461 stored in the portal screen information storage unit 460, in response to a request from the web browser of the information terminal 102. Further, the setting screen providing unit 441 causes the web browser of the information terminal 102 to display the created application setting screen.

The application setting screen is written in a language such as hypertext markup language (HTML), extensible markup language (XML), cascading style sheets (CSS), or JavaScript (registered trademark). Accordingly, the developer can configure settings by performing a predetermined operation on the application setting screen.

Further, in response to a request from the information terminal 102, the setting screen providing unit 441 according to the present embodiment displays a list of custom settings (custom information), included in application information managed by the application management unit 411, on the application setting screen. Further, the setting screen providing unit 441 determines the order of displaying the list of the custom settings based on reference information included in the application information. Details of a process performed by the setting screen providing unit 441 will be described later.

In response to a request from the setting screen providing unit 441, the application registering unit 442 requests the application management unit 411 to register an application or configure or update application settings. For example, in response to an operation for registering an application being performed on the application setting screen provided by the setting screen providing unit 441, the application registering unit 442 requests the application management unit 411 to register the application.

The application information storage unit 450 stores application information such as the above described theme information 451, the setting range information 452, the app information 453, and the processing information 454. The theme information 451, the setting range information 452, the app information 453, and the processing information 454 are examples of application information that includes custom information and reference information.

The portal screen information storage unit 460 stores the portal screen information 461 used to display the application setting screen on the web browser.

(Functional configuration of Information Terminal)

The information terminal 102 implements a display unit 401 and an operation receiving unit 402 by causing the CPU 201 to execute a predetermined program (such as a web browser or an application having a web browser function).

The display unit 401 displays screens such as an application setting screen provided by the portal service unit 440 of the service providing server 101, and an application screen displayed by the web service unit 420, for example.

The operation receiving unit 402 receives an operation performed by the user on an application setting screen or an application screen displayed by the display unit 401, for example.

(Functional Configuration of Electronic Device)

The electronic device 103 implements a display unit 403 and an operation receiving unit 404 by causing the CPU 301 of FIG. 3 to execute a predetermined program (such as a web browser or an application having a web browser function).

The display unit 403 displays screens such as an application screen displayed by the web service unit 420 of the service providing server 101, and an application setting screen provided by the portal service unit 440, for example.

The operation receiving unit 404 receives an operation performed by the user on the application setting screen or the application screen displayed by the display unit 401.

<Flow of Process>

Next, a flow of an information processing method according to an embodiment of the present invention will be described.

(Process for Setting Application Information)

Figure 7:
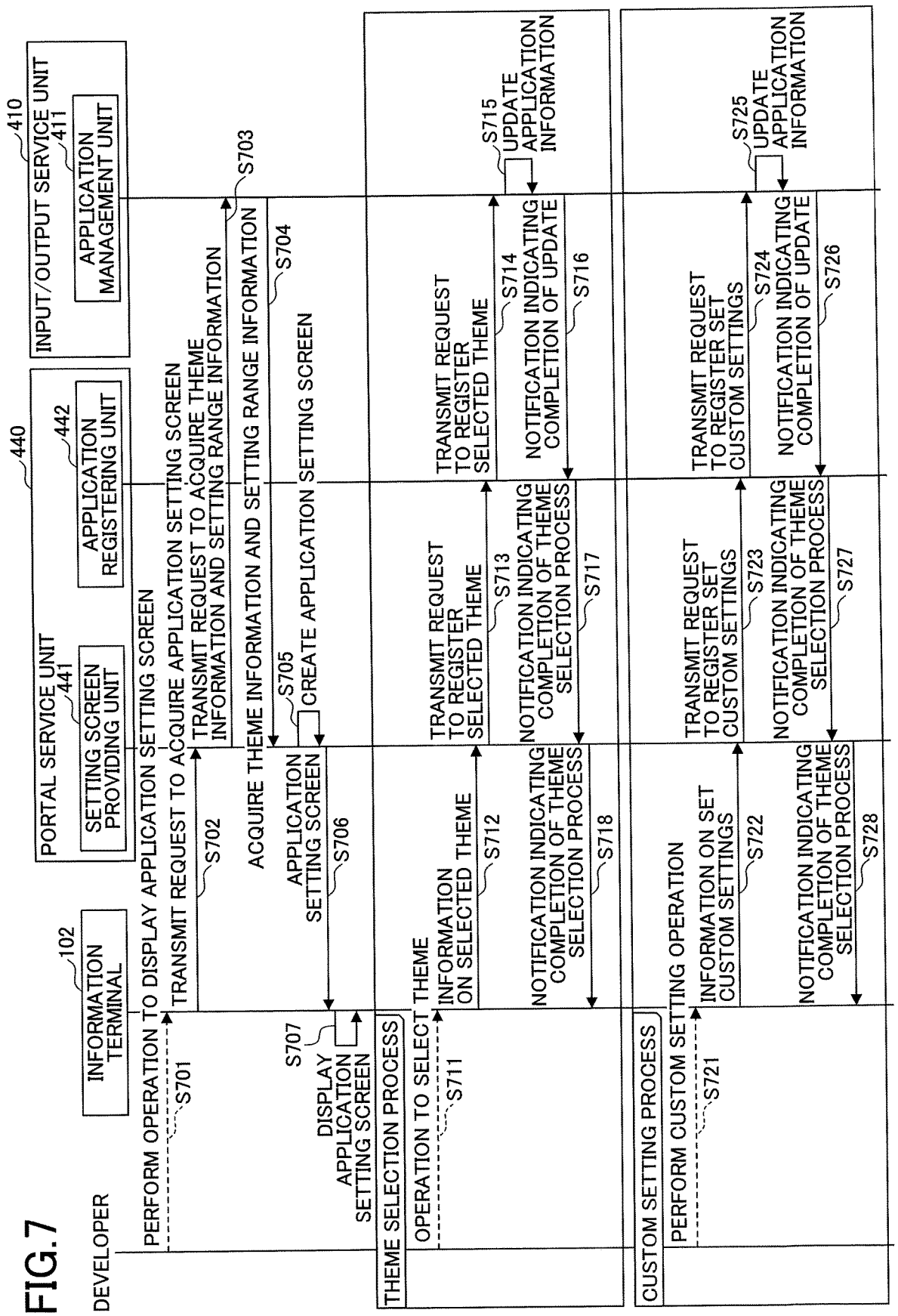
FIG. 7 is a sequence diagram illustrating an example of a process for setting application information.

FIG. 7 is a sequence diagram illustrating an example of a process for setting application information according to an embodiment. In this example, an application developer (or a user) accesses the service providing server 101 through the information terminal 102 to set application information.

In step S701, the developer starts the web browser of the information terminal 102, and performs an operation to display an application setting screen (a screen on which to set application information).

In step S702, in response to receiving the operation to display an application setting screen performed by the developer, the operation receiving unit 402 of the information terminal 102 transmits a request to acquire an application setting screen to the portal service unit 440.

In steps S703 and S704, in response to the request to acquire an application setting screen, the setting screen providing unit 441 of the portal service unit 440 acquires application information, including theme information 451 and setting range information 452, from the application management unit 411.

Figure 8A:
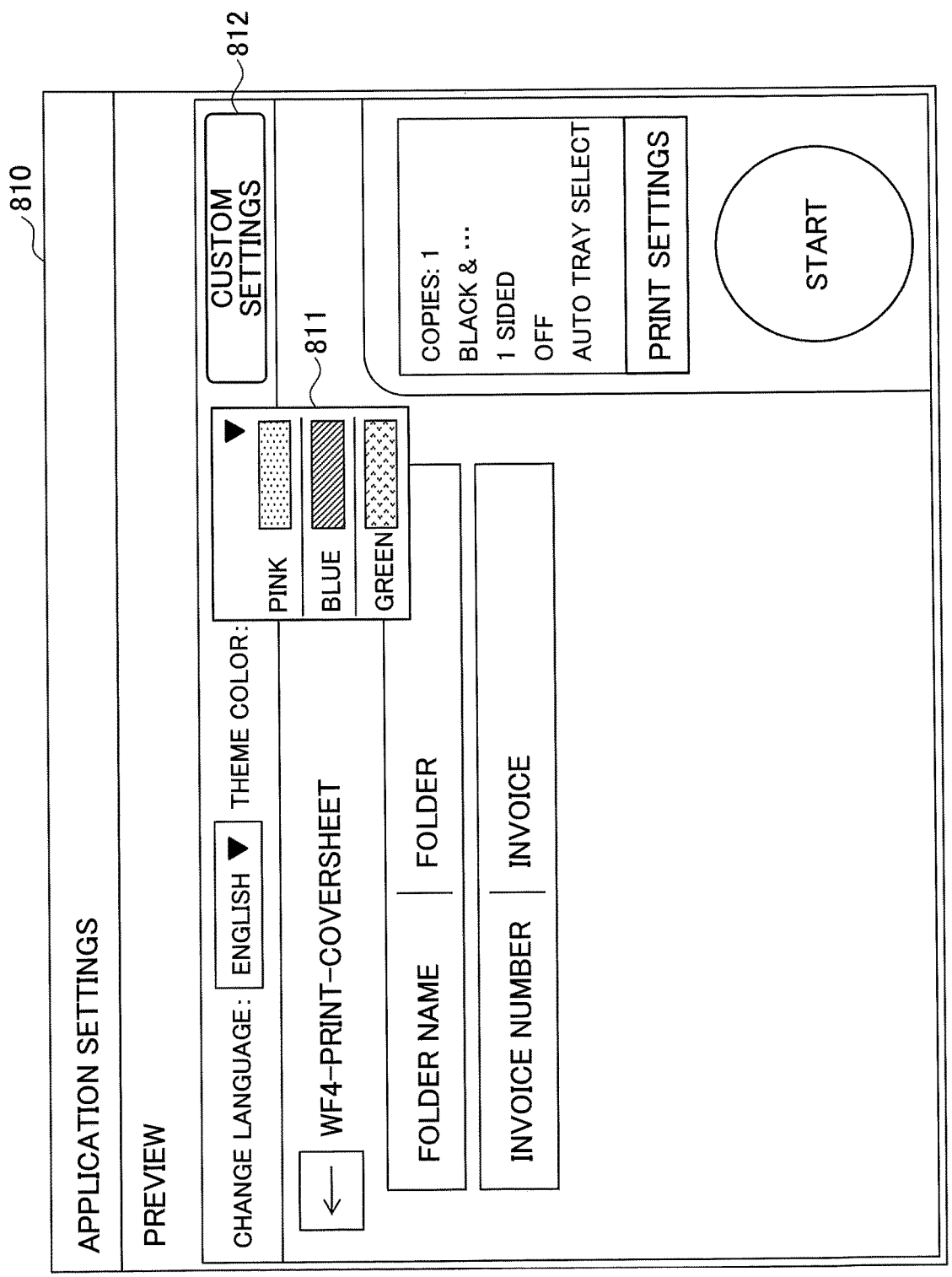

In step S705, the setting screen providing unit 441 uses the acquired theme information 451 and the setting range information 452 to create an application setting screen 810, as illustrated in FIG. 8A, for example. Further, in step S706, the setting screen providing unit 441 transmits the created application setting screen 810 to the requestor information terminal 102.

In step S707, the display unit 401 of the information terminal 102 displays the application setting screen 810 transmitted from the setting screen providing unit 441.

FIG. 8A illustrates an example of the application setting screen 810 displayed by the display unit 401. The application setting screen 810 displays, for example, a pull-down menu 811 that displays a list of themes for selection and a "custom setting" button 812 for customizing an application screen.

In the pull-down menu 811, the list of themes preliminarily defined by a service provider operating the service providing server 101 is displayed for selection. When a theme is selected from the list of the plurality of themes displayed in the pull-down menu 811, the information processing system 100 performs a theme selection process as illustrated in steps S711 through S718 of FIG. 7.

For example, in step S711, the developer performs an operation to select a theme from the pull-down menu 811.

In step S712, in response to receiving the operation to select a theme, the operation receiving unit 402 transmits information on the selected theme to the portal service unit 440.

In steps S713 and S714, in response to receiving the information on the selected theme from the information terminal 102, the setting screen providing unit 441 of the portal service unit 440 transmits a request to register the selected theme to the application management unit 411 via the application registering unit 442.

In step S715, in response to receiving the request to register the selected theme from the portal service unit 440, the application management unit 411 updates application information of a target application. For example, the application management unit 411 registers "id" and "theme" of the selected theme so as to update "css" information 601 of the target application, among a plurality of applications stored in the app information 453 as illustrated in FIG. 6.

In step S716, the application management unit 411 transmits a notification indicating the completion of the update of the application information to the portal service unit 440.

In steps S717 and S718, the application registering unit 442 of the portal service unit 440 transmits a notification indicating the completion of the theme selection process to the information terminal 102 via the setting screen providing unit 441.

Further, when the "custom setting" button 812 is selected on the application setting screen 810 of the FIG. 8A, the setting screen providing unit 441 of the portal service unit 440 displays a custom setting screen 820 as a dialog box on the application setting screen 810, as illustrated in FIG. 8B.

FIG. 8B illustrates an example of the custom setting screen 820. In the example of FIG. 8B, the custom setting screen 820 displays an input field 821 in which to input the name of custom settings, an area 822 in which to select a base color, setting fields 823 in which to set values of setting items, and setting buttons 824 for setting respective ranges of the setting items.

In the area 822 in which to select a base color, the developer can select a base color (such as a color tone, a color classification, or a color group) of target custom settings. Further, as illustrated in FIG. 8B, when the developer sets "blue" in a setting field 823 in which to set the background color of a header, the background color of the header can be customized to "blue". Further, when the developer selects a setting button 824 next to a corresponding setting field 823, a setting screen 830 can be displayed as illustrated in FIG. 8C. In the setting screen, a range of a setting item is set.

The custom setting screen 820 may be displayed by the user, and customization may be performed by the user. Therefore, in order to prevent the user from setting an unexpected value, the developer may use the setting screen 830 as illustrated in FIG. 8C to pre-set a setting range within which the user can set a value for a setting item.

For example, in the example of FIG. 8C, the upper limit value is set to "100 pixels" and the lower limit is set to "50 pixels". Therefore, the user can set the font size in the range of 50 pixels to 100 pixels. Further, if "setting change" is set to "not allowed", the user is prohibited from changing the font size.

Referring back to FIG. 7, a custom setting process performed in steps S721 through S728 will be described.

For example, in step S721, it is assumed that the developer uses the custom setting screen 820 and the setting screen 830 to perform a custom setting operation.

In step S722, in response to receiving the custom setting operation performed by the developer, the operation receiving unit 402 of the information terminal 102 transmits information on the set custom settings to the portal service unit 440.

In steps S723 and S724, in response to receiving the information on the set custom settings from the information terminal 102, the setting screen providing unit 441 of the portal service unit 440 transmits a request to register the set custom settings to the application management unit 411 via the application registering unit 442.

In step S725, in response to receiving the request to register the custom settings from the portal service unit 440, the application management unit 411 updates application information of a target application. For example, the application management unit 411 registers a custom name (an example of information for identifying custom information), a base color, and values for custom settings (custom information) set on the custom setting screen 820 as illustrated in FIG. 8B, so as to update "css" information 601 of the target application. Further, the application management unit 411 registers information set on the setting screen 830 as illustrated in FIG. 8C, so as to update setting range information 452 of the target application.

In step S726, the application management unit 411 transmits a notification indicating the completion of the update of the application information to the portal service unit 440.

In steps S727 and S728, the application registering unit 442 of the portal service unit 440 transmits a notification indicating the completion of the custom setting process to the information terminal 102 via the setting screen providing unit 441.

With the above-described process, it is possible for the developer to register, in the service providing server 101, application information of a target application whose display screen (application screen) has been customized.

(Process for Displaying Application Screen)

Figure 9:
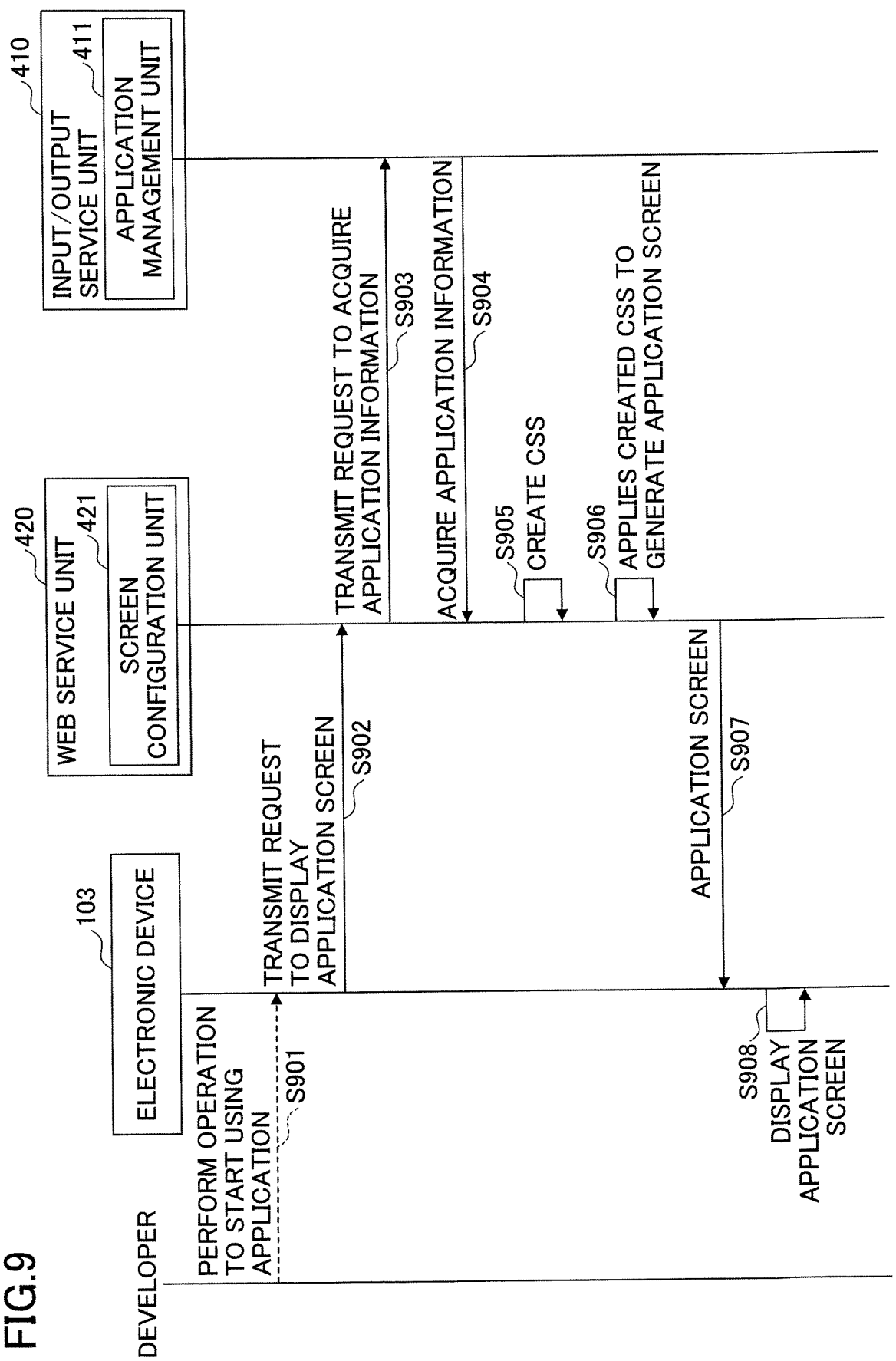
FIG. 9 is a sequence diagram illustrating an example of a process for displaying an application screen.

FIG. 9 is a sequence diagram illustrating an example of a process for displaying an application screen. In this example, the application screen is displayed when a user (or a developer) uses an application through the web browser of the electronic device 103 (or the web browser of the information terminal 102).

In step S901, the user (or the developer) performs an operation to start using an application. For example, the user displays a web page, displaying a list of applications provided by the web service unit 420, through the web browser of the electronic device 103, and selects an application to use.

In step S902, in response to receiving the operation to start using the application, the operation receiving unit 404 of the electronic device 103 transmits a request to display an application screen for the selected application to the web service unit 420.

In steps S903 and S904, the screen configuration unit 421 of the web service unit 420 acquires application information from the application management unit 411 of the input/output service unit 410.

In step S905, the screen configuration unit 421 creates a cascading style sheet (CSS) used to display an application screen. The CSS is a style sheet used for style definitions for web pages. The screen configuration unit 421 uses custom information, such as a theme and values of setting items included in the application information, to create a CSS that defines display styles such as colors, sizes, and layouts of application screen elements defined in HTML.

In step S906, the screen configuration unit 421 applies the created CSS to generate an application screen. Further, in step S907, the screen configuration unit 421 transmits the generated application screen to the requestor electronic device 103.

In step S907, the display unit 403 of the electronic device 103 displays the application screen transmitted from the web service unit 420.

With the above-described process, it is possible for the web service unit 420 to cause the web browser of the electronic device 103 to display the application screen to which the custom information set through the process for setting application information of FIG. 7 has been applied.

<Process for Sharing Custom Information>

In the present embodiment, when the developer customizes an application screen of a target application, custom information set for another application can be used. Accordingly, the process for setting application information as described with reference to FIG. 7 can be facilitated.

First Embodiment

Figure 10:
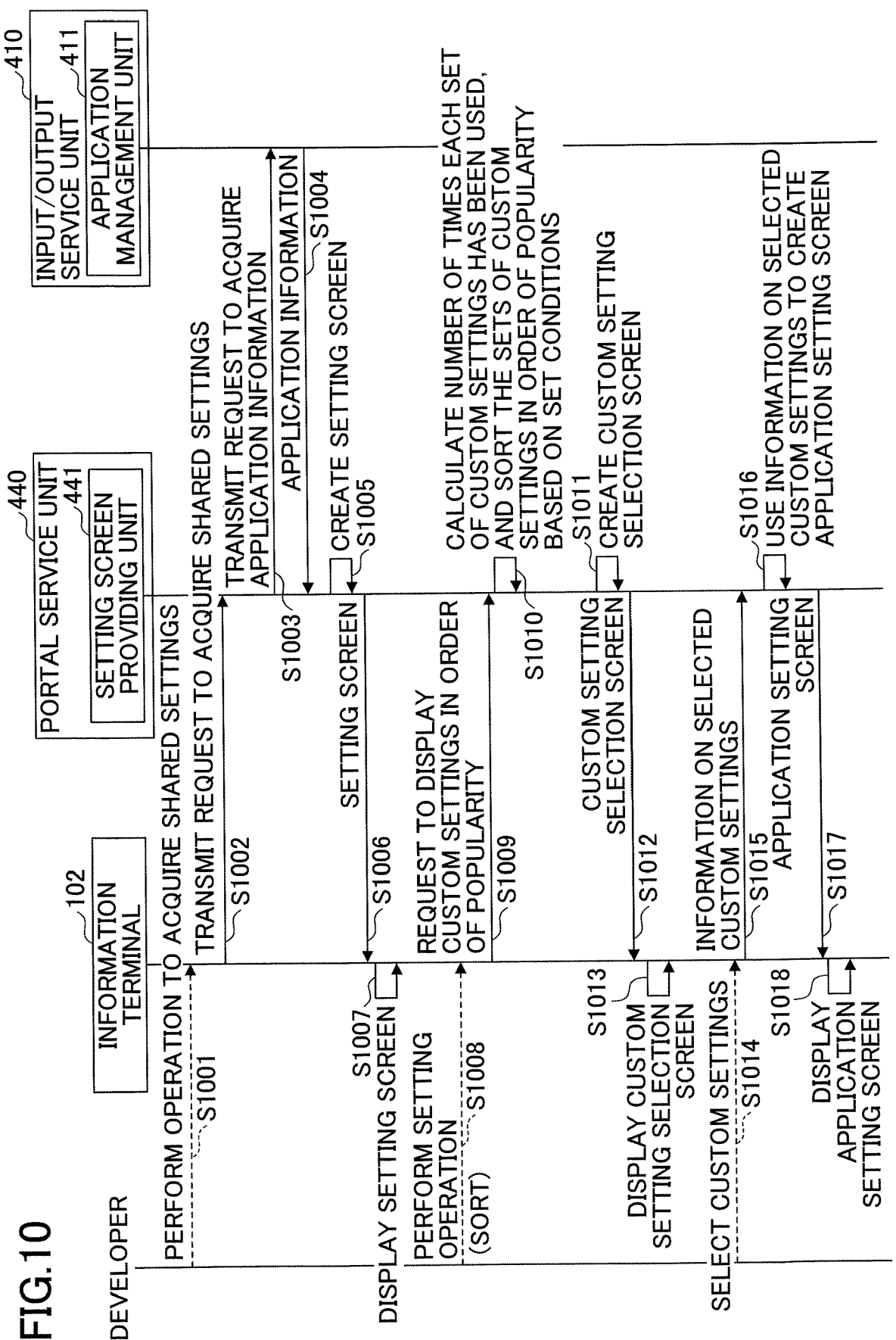
FIG. 10 is a sequence diagram illustrating an example of a process for sharing custom settings according to a first embodiment.

FIG. 10 is a sequence diagram illustrating an example of a process for sharing custom settings according to a first embodiment. In this example, custom information set for another application is used to customize an application screen of a target application, thereby facilitating the process for setting application information.

Figure 11A:
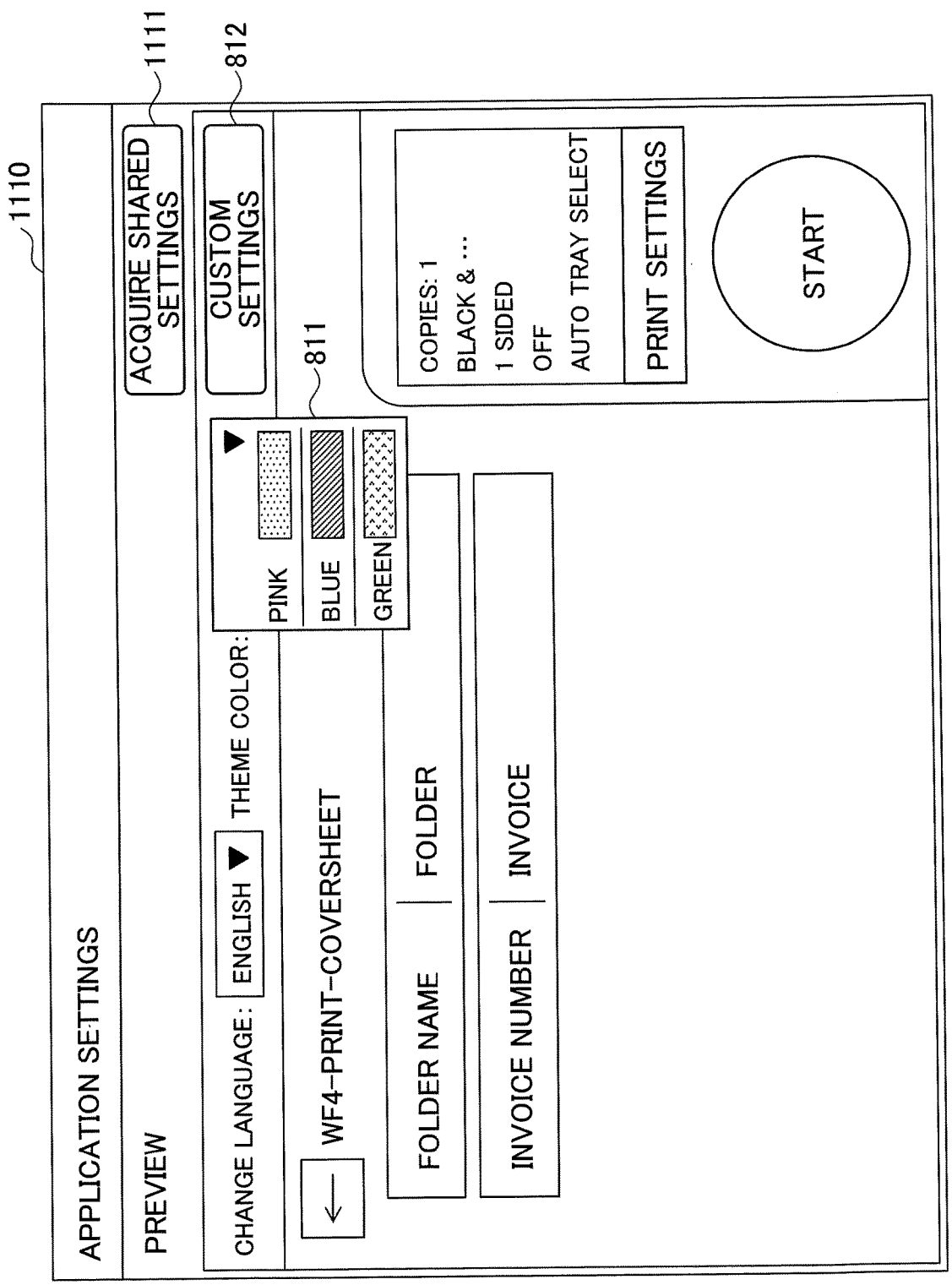

It is assumed that at the start of the process illustrated in FIG. 10, an application setting screen 1110 as illustrated in FIG. 11A is displayed by the information terminal 102 through steps similar to steps S701 through S707 of FIG. 7.

FIG. 11A illustrates an example of the application setting screen 1110 according to the first embodiment. As compared to the application setting screen 810 of FIG. 8A, an "acquire shared settings" button 1111 is additionally included in the application setting screen 1110 according to the first embodiment. By selecting the "acquire shared settings" button 1111, the developer can acquire shared settings.

In step S1001 of FIG. 10, the developer (or the user) performs an operation to acquire shared settings on the application setting screen 1110 displayed by the information terminal 102.

In step S1002, in response to receiving the operation to acquire shared settings, the operation receiving unit 404 of the electronic device 103 transmits a request to acquire shared settings to the portal service unit 440.

In steps S1003 and S1004, the setting screen providing unit 441 of the portal service unit 440 acquires application information, including the app information 453 as illustrated in FIG. 6, from the application management unit 411 of the input/output service unit 410. The app information 453 includes information on custom settings (custom information) set for each application managed by the application management unit 411, and also includes information (reference information) such as a region and an industry in which each of the applications is used.

In step S1005, the setting screen providing unit 441 creates a setting screen on which to sort custom settings to be displayed. In step S1006, the setting screen providing unit 441 transmits the created setting screen to the information terminal 102 for display.

Accordingly, in step S1007, the display unit 401 of the information terminal 102 displays a setting screen 1120 as illustrated in FIG. 11B, on the setting screen 1120.

FIG. 11B illustrates an example of the setting screen 1120 on which to sort custom settings to be displayed. For example, the setting screen providing unit 441 displays the setting screen 1120 as illustrated in FIG. 11B, as a dialog box on the application setting screen 1110.

In the example of FIG. 11B, the setting screen 1120 displays a "sort" button 1121, and also an area 1122 in which to set a sort type such as "region" and "industry".

Figure 12A:
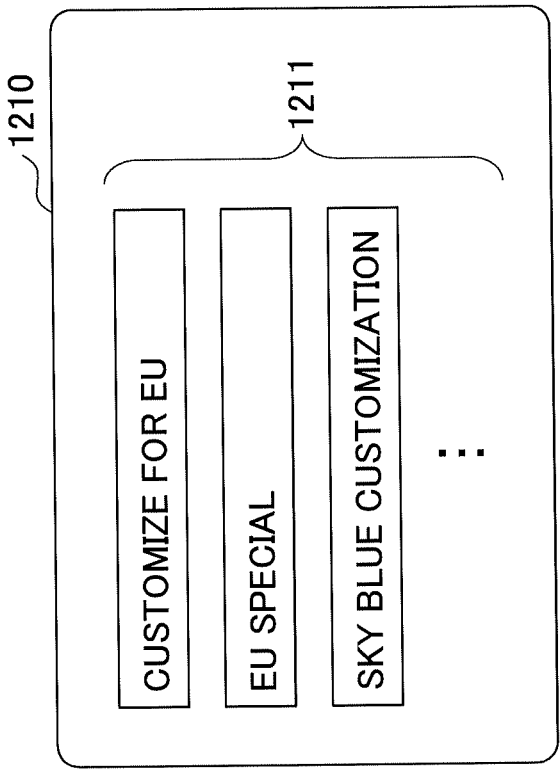
FIG. 12A through FIG. 12D are diagrams (2) illustrating examples of display screens according to the first embodiment.
Figure 12B:
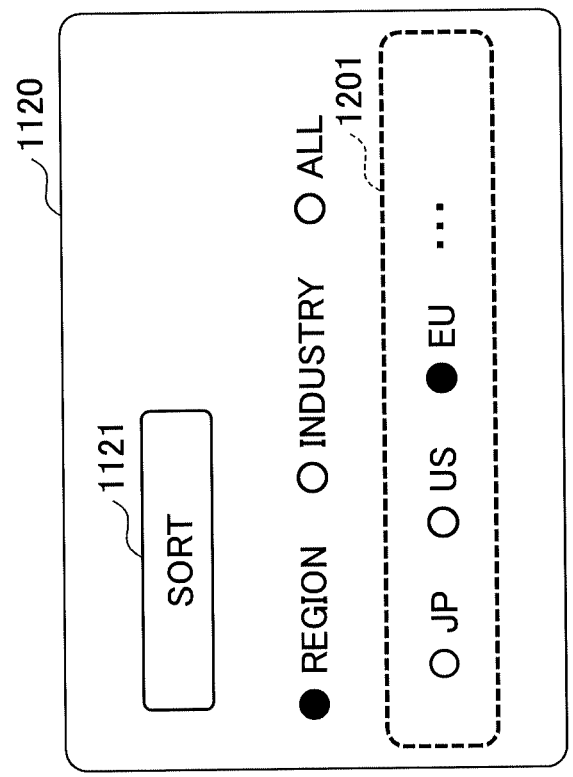

As an example, when the sort type "region" is selected in the area 1122 of the setting screen 1120, the setting screen 1120 displays an area 1201 in which to set a region, as illustrated in FIG. 12A. Further, when a region (such as EU) is selected in the area 1201 and a "sort" button 1121 is selected on the setting screen 1120, a custom setting selection screen 1210 as illustrated in FIG. 12B is displayed. The custom setting selection screen 1210 displays, for selection, a list of custom settings (custom information) corresponding to the region set on the setting screen 1120.

Figure 12D:
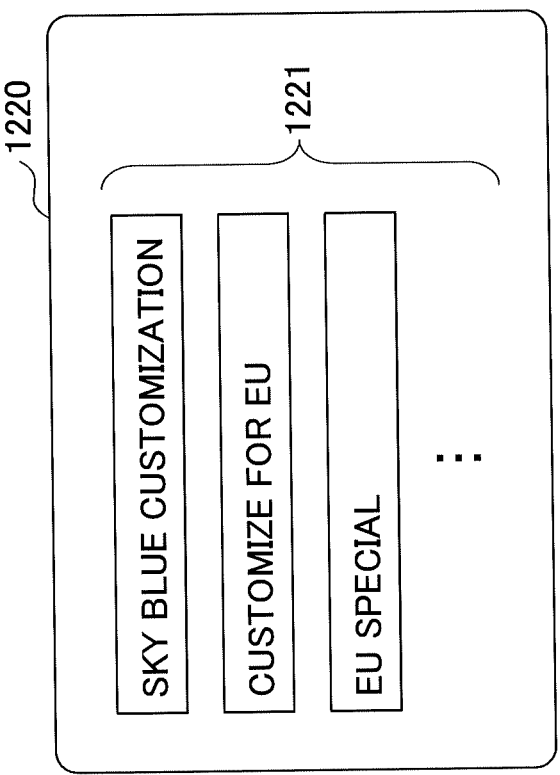
Figure 12C:
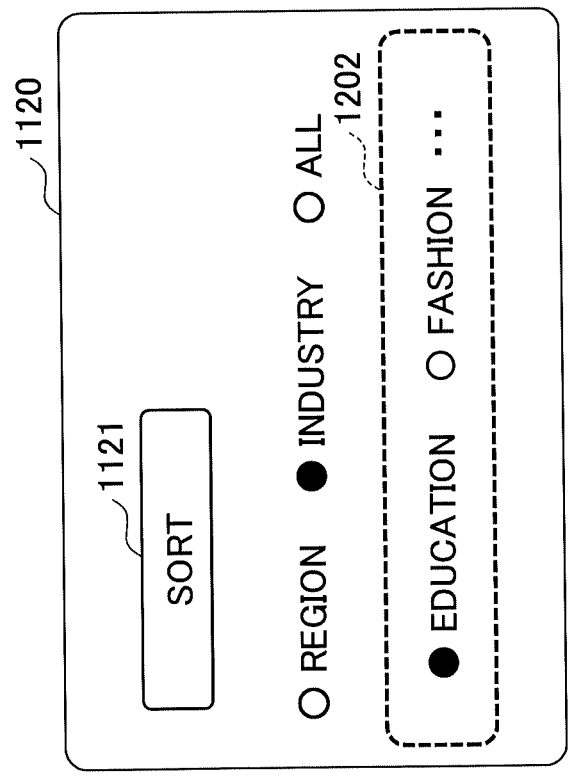

As another example, when the sort type "industry" is selected in the area 1122 of the setting screen 1120, the setting screen 1120 displays an area 1202 in which to set an industry as illustrated in FIG. 12C. Further, when an industry (such as education) is selected in the area 1201 and a "sort" button 1121 is selected on the setting screen 1120, a custom setting selection screen 1220 as illustrated in FIG. 12D is displayed. The custom setting selection screen 1120 displays, for selection, a list of custom settings (custom information) corresponding to the industry set on the setting screen 1120.

Referring back to FIG. 10, the sequence diagram continues to be described.

In step S1008, the developer performs a setting operation by using the setting screen 1120 to sort custom settings to be displayed on a custom setting selection screen. For example, the developer selects an area in the area 1201 and selects the "sort" button 1121 on the setting screen 1120 as illustrated in FIG. 12A. Alternatively, the developer selects an industry in the area 1202 and selects the "sort" button 1121 on the setting screen 1120 as illustrated in FIG. 12C.

In step S1009, in response to receiving the setting operation performed by the developer, the operation receiving unit 402 of the information terminal 102 transmits a request to display custom settings in order of popularity based on the set conditions.

In step S1010, the setting screen providing unit 441 of the portal service unit 440 calculates the number of times each set of custom settings has been used, and sorts the sets of custom settings in order of popularity based on the set conditions. For example, the setting screen providing unit 441 uses "css" information 601 and reference information included in "usage" information 602 acquired in step S1004 to calculate the number of times each set of custom settings has been set (used).

For example, if the conditions set on the setting screen 1120 are "region and EU", the setting screen providing unit 441 identifies applications whose "region" is "EU" in "usage" information 602. Further, in the applications whose "region" is "EU", the setting screen providing unit 441 calculates the number of times each "custom name" (information for identifying custom information) has been set (used). Further, the setting screen providing unit 441 sorts sets of custom settings in order of popularity, namely in order of number of times each "custom name" is used.

Similarly, if the conditions set on the setting screen 1120 are "industry and education", the setting screen providing unit 441 identifies applications whose "industry" is "education" in "usage" information 602. Further, in the applications whose "industry" is "education", the setting screen providing unit 441 calculates the number of times each "custom name" has been set (used). Further, the setting screen providing unit 441 sorts sets of custom settings in order of popularity, namely in order of number of times each "custom name" has been used.

In step S1011, the setting screen providing unit 441 creates a custom setting selection screen that displays, for selection, the list of sets of custom settings sorted in order of popularity.

As an example, it is assumed that the conditions set on the setting screen 1120 are "region and EU". In this case, as illustrated in FIG. 12B, the setting screen providing unit 441 creates a custom setting selection screen 1210 that displays, for selection, a list of sets of custom settings whose selection buttons 1211 are sorted in order of popularity based on the conditions of "region and EU".

Further, as another example, it is assumed that the conditions set on the setting screen 1120 are "industry and education". In this case, as illustrated in FIG. 12D, the setting screen providing unit 441 sorts sets of custom settings in order of popularity based on the set conditions of "industry and education", and displays a list of selection buttons 1221 corresponding to the sets of custom settings.

In step S1012, the setting screen providing unit 441 transmits the created custom setting selection screen to the requestor information terminal 102.

In step S1013, the display unit 401 of the information terminal 102 displays the custom setting selection screen transmitted from the setting screen providing unit 441. Accordingly, the developer can select a desired set of custom settings from the list of the sets of custom settings displayed on the custom setting selection screen 1210 as illustrated in FIG. 12B, and use the desired set of custom settings.

For example, when the developer selects a set of custom settings from the list of sets of custom settings displayed on the custom setting selection screen 1210 in step S1014, the process proceeds to step S1015.

In step S1015, in response to receiving the selection of the set of custom settings by the developer, the operation receiving unit 404 of the information terminal 102 transmits information on the selected set of custom settings to the portal service unit 440.

In step S1016, the setting screen providing unit 441 of the portal service unit 440 uses the information on the selected set of custom settings to create an application setting screen 810 as illustrated in FIG. 8A, for example. In step S1016, the setting screen providing unit 441 transmits the created application setting screen 810 to the information terminal 102.

In step S1018, the display unit 401 of the information terminal 102 displays the application setting screen 810 transmitted from the setting screen providing unit 441. Because the set of custom settings selected in step S1014 is applied to the application setting screen 810, the developer can customize an application screen based on the selected custom settings.

Note that steps S1016 through S1018 are merely examples. For example, in step S1015, the portal service unit 440 may register the selected custom settings, transmitted from the information terminal 102, in the application management unit 411 as custom settings for a target application.

With the above-described process, the developer can readily set custom information for a target application by using custom information (custom settings) of another pre-registered application.

Second Embodiment

In the first embodiment, an example in which a list of custom settings is sorted and displayed in order of popularity (in order of the number of times used) has been described.

In the second embodiment, an example in which a list of custom settings is displayed based on a base color (such as a color tone, a color classification, or a color group) will be described.

Figure 13:
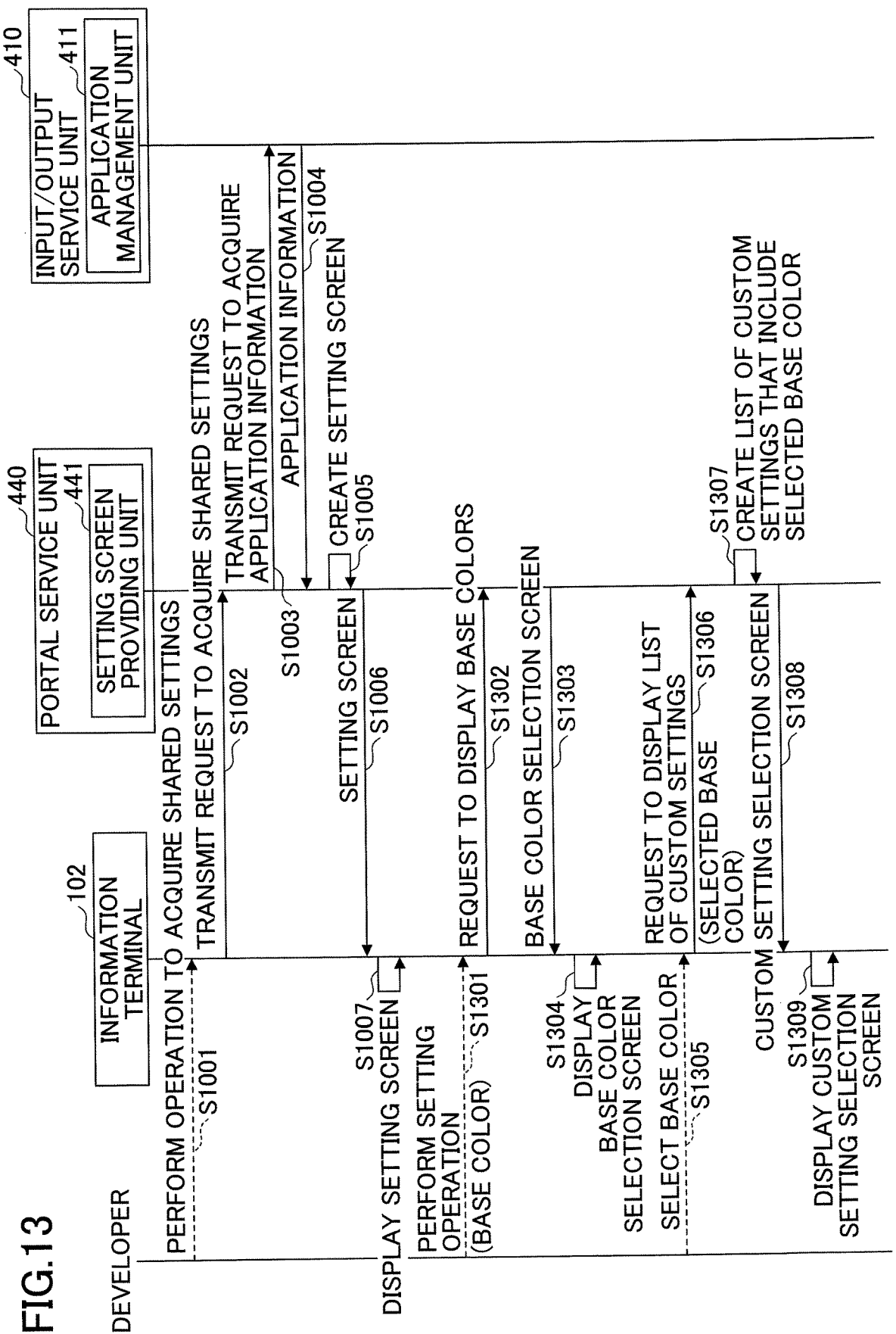
FIG. 13 is a sequence diagram illustrating another example of the process for sharing custom settings according to a second embodiment.

FIG. 13 is a sequence diagram illustrating another example of a process for sharing custom settings according to the second embodiment. In this example, custom information set for another application is used to customize an application screen of a target application, thereby facilitating the process for setting application information.

Steps S1001 through S1007 in the process illustrated in FIG. 13 are the same as those of the first embodiment illustrated in FIG. 10. In the following, differences between the first embodiment and the first embodiment will be mainly described.

Figure 14B:
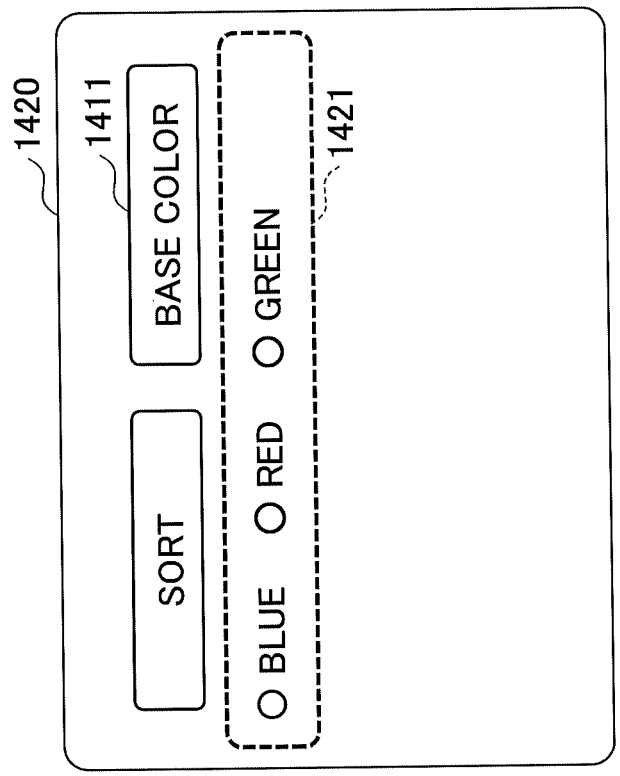
FIG. 14A through FIG. 14D are diagrams illustrating examples of display screens according to the second embodiment.
Figure 14A:
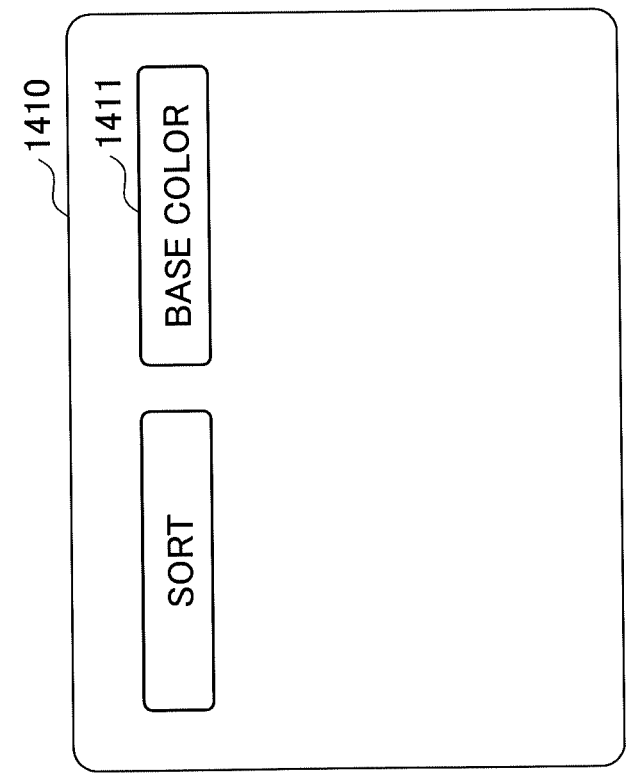

FIG. 14A illustrates an example of a setting screen 1410 displayed in step S1007 of FIG. 13. On the setting screen 1410, a method for displaying a custom setting selection screen is selected. The setting screen 1410 according to the second embodiment displays a "base color" button 1411. The "base color" button 1411 is merely an example. For example, a "color classification" button or a "color group" button may be displayed.

In S1301 of FIG. 13, when the developer selects the "base color" button 1411 on the setting screen 1410, the process proceeds to step S1302.

In step S1302, in response to receiving the selection of the "base color" button 1411, the operation receiving unit 402 of the information terminal 102 transmits a request to display base colors, including the set base color (such as "blue"), to the portal service unit 440.

In step S1303, the setting screen providing unit 441 of the portal service unit 440 creates a base color selection screen 1420 as illustrated in FIG. 14B, and transmits the created base color selection screen 1420 to the requestor information terminal 102.

In step S1304, the display unit 401 of the information terminal 102 displays the base color selection screen 1420, transmitted from the setting screen providing unit 441, as a dialog box on the setting screen 810. As illustrated in FIG. 14B, the base color selection screen 1420 displays an area 1421 in which to select a base color. In the example of FIG. 14B, the area 1421 displays base colors such as colors of "blue", "red", and "green", for selection.

Figure 14D:
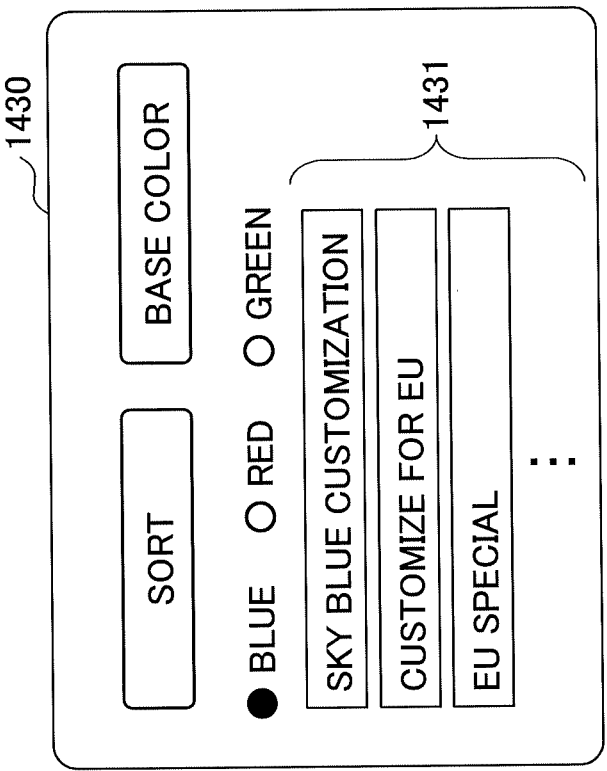
Figure 14C:
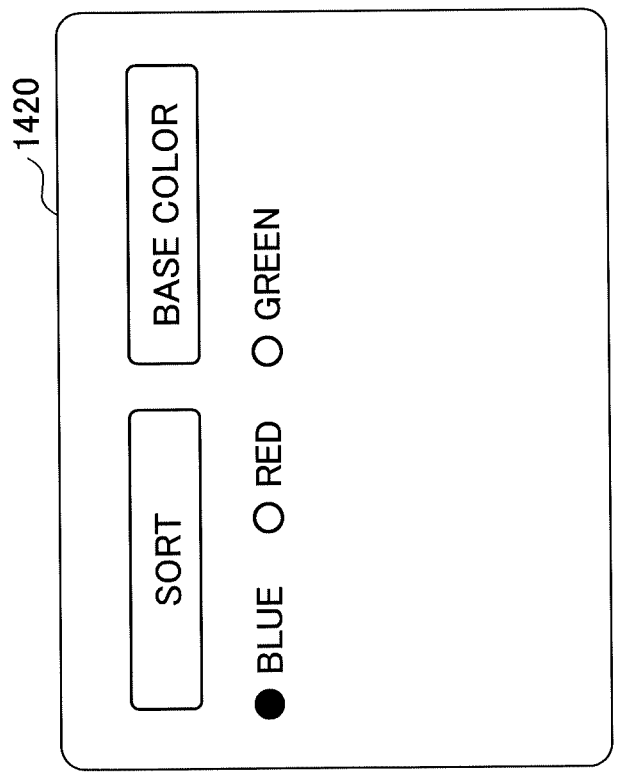

In step S1305, when the developer selects a base color (such as "blue") in the area 1421 as illustrated in FIG. 14C, the process proceeds to step S1306.

In step S1306, in response to receiving the selection of the base color by the developer, the operation receiving unit 402 of the information terminal 102 transmits a request to display a list of custom settings that include the selected base color to the portal service unit 440.

In step S1307, the setting screen providing unit 441 of the portal service unit 440 creates a list of custom settings that include the selected base color. For example, if the selected base color is "blue", the setting screen providing unit 441 extracts applications whose "theme" is "blue" in "css" information 601 of the app information 453. Further, the setting screen providing unit 441 creates a list of custom settings for the extracted applications.

Preferably, similar to the first embodiment, the setting screen providing unit 441 sorts custom settings set for the extracted applications in order of popularity (in order of the number of times each set of custom settings has been used), and creates a list of custom settings.

In step S1308, the setting screen providing unit 441 creates a custom setting selection screen that includes the created list of custom settings, and transmits the custom setting selection screen to the requestor information terminal 102.

In step S1309, the display unit 401 of the information terminal 102 displays the custom setting selection screen transmitted from the setting screen providing unit 441. For example, the display unit 401 displays a custom setting selection screen 1430 as illustrated in FIG. 14D.

For example, the list of custom settings created in step S1307 is displayed on the custom setting selection screen 1430, as illustrated in FIG. 14D. For example, as the list of custom settings, the custom setting selection screen 1430 displays a plurality of selection buttons 1431 that correspond to the custom settings corresponding to the theme selected on the base color selection screen 1420.

With the above-described process, it becomes possible for the developer to create a list of custom settings in which the selected theme is included, from among custom settings set for pre-registered applications, and to apply a desired set of custom settings to a target application.

According to an embodiment of the present invention, custom information for a target application is set by utilizing custom information of a plurality of pre-registered applications.

Various aspects of the subject-matter described herein may be set out non-exhaustively in the following clause:

A non-transitory recording medium storing a program for causing a server apparatus for provision of a plurality of applications to execute a process including managing application information that includes a plurality of pieces of custom information for customizing display screens of the plurality of applications and also includes reference information; causing a terminal device to display a setting screen on which a given piece of custom information is to be set, in response to a request from the terminal device; displaying a list of the plurality of pieces of custom information, included in the application information, enabled for selection on the setting screen; and determining an order of displaying the list of the plurality of pieces of custom information based on the reference information.

<Supplement>

Further, the functions of the above-described embodiments may be implemented by one or more processing circuitries. As used herein, the term "processing circuitry" includes a device such as a processor programmed to cause software to execute the functions, such as a processor implemented by an electronic circuitry, and an application-specific integrated circuit (ASIC), a digital signal processor (DSP), a field-programmable gate array (FPGA), and a circuit module designed to execute the above-described functions.

Further, the present invention is not limited to these embodiments, but various variations and modifications may be made to the described subject matter without departing from the scope of the present invention.

What is claimed is:

1. An information processing system comprising:
a server apparatus configured to provide a plurality of applications; and
a terminal device coupled to the server apparatus via a network, and configured to set a plurality of pieces of custom information for customizing display screens of the plurality of applications,
wherein the terminal device includes a first memory and a first processor coupled to the first memory and configured to
display a setting screen, and
receive an operation performed on the setting screen, and
wherein the server apparatus includes a second memory and a second processor coupled to the second memory and configured to
manage application information that includes the plurality of pieces of custom information and reference information, each piece of the custom information including a combination of a plurality of values for a plurality of different setting items,
cause the terminal device to display the setting screen on which a given piece of custom information is to be set, in response to a request from the terminal device, and a list of the plurality of pieces of custom information, included in the application information, enabled for selection on the setting screen, and
determine an order of displaying a plurality of combinations of the plurality of values for the plurality of different setting items within the list based on the reference information.

2. The information processing system according to claim 1, wherein the reference information includes information for identifying the plurality of pieces of custom information set for the plurality of applications, and
the second processor sorts the list of the plurality of pieces of custom information, based on the number of times each of the plurality of pieces of custom information has been set, and displays the sorted list of the plurality of pieces of custom information.

3. The information processing system according to claim 1, wherein the reference information includes information on a region, the region being selected on the setting screen, and
the second processor sorts a list of a plurality of pieces of custom information corresponding to the selected region, and displays the sorted list of the plurality of pieces of custom information on the setting screen.

4. The information processing system according to claim 1, wherein the reference information includes information on an industry, the industry being selected on the setting screen, and
the second processor sorts a list of a plurality of pieces of custom information corresponding to the selected industry, and displays the sorted list of the plurality of pieces of custom information on the setting screen.

5. The information processing system according to claim 1, wherein the reference information includes information on a base color, the base color being selected on the setting screen, and
the second processor sorts a list of a plurality of pieces of custom information corresponding to the selected base color, and displays the sorted list of the plurality of pieces of custom information on the setting screen.

6. The information processing system according to claim 1, wherein the second processor causes the terminal device to display the setting screen on which the given piece of custom information is set for a target application based on selected one of the list of the plurality of pieces of custom information.

7. The information processing system according to claim 1, wherein the second processor is further configured to utilize the list of the plurality of pieces of custom information to create a display screen of a given application of the plurality of applications, and cause an electronic device using the given application to display the display screen of the given application.

8. A server apparatus for provision of a plurality of applications, the server apparatus comprising:
a memory; and
a processor coupled to the memory and configured to
manage application information that includes a plurality of pieces of custom information for customizing display screens of the plurality of applications and also includes reference information, each piece of the custom information including a combination of a plurality of values for a plurality of different setting items,
cause a terminal device to display a setting screen on which a given piece of custom information is to be set, in response to a request from the terminal device, and a list of the plurality of pieces of custom information, included in the application information, enabled for selection on the setting screen, and determine an order of displaying a plurality of combinations of the plurality of values for the plurality of different setting items within the list based on the reference information.

9. An information processing method performed by a server apparatus for provision of a plurality of applications, the method comprising:

managing application information that includes a plurality of pieces of custom information for customizing display screens of the plurality of applications and also includes reference information, each piece of the custom information including a combination of a plurality of values for a plurality of different setting items;

causing a terminal device to display a setting screen on which a given piece of custom information is to be set, in response to a request from the terminal device and a list of the plurality of pieces of custom information, included in the application information, enabled for selection on the setting screen; and determining an order of displaying a plurality of combinations of the plurality of values for the plurality of different setting items within the list based on the reference information.

10. The information processing system according to claim 1, wherein each piece of the custom information includes theme information indicating a combination of multiple settings including background, fonts, text colors, and icons displayed on a display screen of a corresponding application of the plurality of applications.

11. The information processing system according to claim 1, wherein the first processor is configured to transmit, to the server apparatus, an instruction to send shared settings to the terminal device, and wherein the second processor is configured to determine the order of displaying the plurality of combinations of the plurality of values within the list upon receiving the instruction.

* * * * *